June 25, 1963 J. GVOZDJAK ETAL 3,095,495
FOOD BROILING DEVICE
Filed April 28, 1960 2 Sheets-Sheet 1

INVENTOR.
John Gvozdjak
Roy M. Onischak
BY
Marvin M. Chaban Atty

June 25, 1963    J. GVOZDJAK ETAL    3,095,495
FOOD BROILING DEVICE

Filed April 28, 1960    2 Sheets-Sheet 2

INVENTORS
John Gvozdjak
BY Roy M. Onischak.

Marvin M. Chaban Atty

United States Patent Office 3,095,495
Patented June 25, 1963

3,095,495
FOOD BROILING DEVICE
John Gvozdjak, Calumet City, and Roy M. Onischak, Chicago, Ill., assignors to General Electric Company, a corporation of New York
Filed Apr. 28, 1960, Ser. No. 25,312
4 Claims. (Cl. 219—35)

This invention relates to cooking devices and more particularly to food broilers in which the food to be broiled is held on a grid above a radiant heat source.

In broilers of this type there is generally provided a food retaining grid positioned within the confines of a cooking area which may be rectangular in extent. Positioned below the grid is a radiant heat source, such as an electric resistance heater which comprises a helical resistance wire within a tubular metallic sheath. The heater is configurated in sinuous or serpentine fashion to include a plurality of straight run heating portions. Positioned below the heater is a drip tray for receiving and retaining the drippings from the food being cooked. The heater on energization emits radiant energy in all directions. Preferably this radiant energy should be focused upwardly to concentrate the emitted rays on the food being cooked and further to keep the direct radiant rays from all collected drippings in the drip tray. In this way, the temperature of the drippings in the drip tray may be retained below the flash of the fat content thereof, while the food above is being cooked.

A further consideration in broilers of this type is that of producing a charcoal effect. It has been found that if a portion of the drippings flash and burn, the net effect of the burning carbonaceous matter is to impart a charcoal flavor to the food being broiled. However, the resultant residue from burning of the carbonaceous matter cannot be allowed to build up about the heating unit or a considerable amount of corrosion is induced in the metallic sheath which in turn leads to premature failure of the heating elements. With these factors in mind, we have devised the present invention.

The invention has as its object to provide a heat transfer shield to intercept a desired portion of direct radiation emanating from the sheath, whereby to stop these direct rays from reaching the accumulated drippings in the drip tray.

A further object is to provide a radiation heat shield which has a surface exposed to the heating unit sheath which will not accumulate drippings, but will cause deflux of the drippings along the exposed sides of the shield for flash-burning thereon.

Another object of the invention is to provide an air foil shaped heat shield directly below each of the heating units so that vertical air currents will be deflected away from the heating units. In this way a minimum of the heat output of the units will be lost to the air currents. Further, the lower portions of the shields will be kept relatively cool by being exposed to a maximum amount of the cooling air currents.

Other objects, features and advantages of the present invention will be apparent from the detailed description of the preferred embodiments thereof read in conjunction with the following drawings in which.

Figure 1:
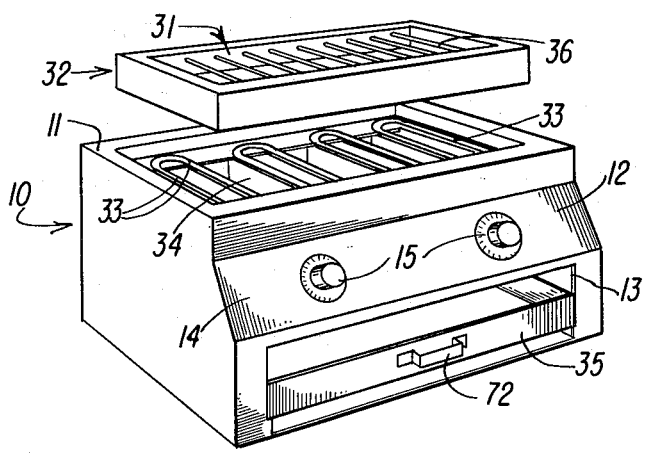
FIG. 1 is a front perspective view of a cooking device utilizing our invention, with the food-receiving section shown separated from the device to more clearly disclose the heating unit and heat shields.

Referring now to FIGS. 1, 2, 3 and 7, there is shown a broiler unit 10 enclosed within a generally rectangular sheet metal housing 11. The housing includes a front wall 12 having an open lower section 13 and an upper oblique section 14. Mounted to the oblique section are one or more manually rotatable control knobs 15, each of which is used to manipulate an individual control mechanism 16. Each mechanism 16 comprises a switching device for varying the wattage input to the heaters, as well known in the art. Each mechanism 16 may be mounted to the underside of the angled wall section 14 and within a compartment 17 which has a thermal barrier wall 18 insulating the control mechanism from the cooking area. The cooking area is generally rectangular in extent and is defined by the barrier wall 18, inner side walls 22 and 23 and rear wall 24. These walls are all spaced from outer housing 11 by means of an inturned flange 25 at the upper edge of the housing 11. This flange further serves as a strengthening member for reinforcing the structure. These cooking area walls may be integrally fabricated with an inner bottom 26 of suitable sheet metal with an open section along the lower portion of wall 18 which then forms an open passageway from the cooking area to the broiler exterior. Inner bottom 26 may have a large aperture therein to further allow air circulation from this passageway through the cooking area. To provide another circulatory path, rear wall 24 may have an opening 27 which allows cooling air to flow along the broiler base through opening 27 to the cooking area.

Within the open topped cooking area 31, positioned in descending order are: the food retaining grid structure 32, the heating units 33, shielding vanes 34, drip pan 35, and the bottom inner wall 26. Food to be broiled is placed on the grid; the heating units supply radiant and convective heat for the broiling process, and excess grease and fats emitted by the food during the broiling process drip down and are collected in the drip pan.

Within such a broiling apparatus, the relative proportions of the components and the vertical dimensional spacing between components may be as follows: approximately one inch from the grid to the heating units; 1/32" to 1/8" from the heating unit sheath to the top of the vanes; the vanes may be within the range of from 1½" to 2½" in vertical dimension and the overall distance from the heating units to the drip pan may be about 7 inches. Horizontally there may be from 7/8" to 1" center to center spacing between the heating units of the presently preferred embodiment of our invention.

Analyzing the components separately, there is first the grid structure 32. The grid is formed by a plurality of parallel, spaced members 36 which are fabricated from a heat resistant metal such as stainless steel in order that the grid may withstand the intense temperatures generated by the heating units. These members may be solid rods or preferably hollow tubes. The grid structure rests removably on an inturned flange 37 at the top of the cooking area sidewalls. Flange 37 in this way holds the grid at a level in which the grid members are recessed slightly from the top of the broiler unit sidewalls to hold therein food to be broiled.

Positioned in a plane directly below the grid structure are the heating units 33. The heating units are comprised of a plurality of parallel U shaped electrical resistance heating units. These heating unit seach comprise a helical resistance heating element, within a tubular metal sheath and supported in uniformly spaced relationship to the sheath by a highly compacted mass of a suitable heat conducting and electrically insulating material such as powdered magnesium oxide. Each heating unit has terminal portions at the U tips offset from the heat generating portions. These offset terminal portions extend into the control compartment 17 for connection to the respective control mechanisms 16. As shown, there are two control mechanisms 16, hence each mechanism must control four of the eight heating units as exemplified herein. Through these control mechanisms, the heating units are supplied with the necessary power from alternating current source (not shown). The units are supported at the terminal end by means of a lateral beam 38 having fingers 38.1 crimped against the heating units to firmly hold the units in the known manner. At the opposite end of the unit, sheaths rest on a cross beam member 39. This cross beam member has uncrimped fingers about the sheath so that the sheath may expand in lengths on heating.

Each heating unit has two straight lengths connected by the U bend and these straight lengths which comprise the heat generating portions of the heating unit are aligned in a plane directly below and parallel to the grid members. Beneath each of the straight lengths of the heating units and coextensive therewith are positioned the heat transfer and shielding vanes 34 which form the substance of the present invention. Various vane cross-sectional configurations have been shown which may be acceptable to function in the proper manner. Each of these vane shapes, as may be seen individually in FIGS. 4, 5 and 6, has certain characteristics in common. Each of these vane shapes exhibit a convex or crowned surface adjacent to heat unit straight length portion above it, with the uppermost tip of the crowned surface directly below the sheath. Each of the vanes also tapers to a sharply angled dihedral edge at its lower end. All of the vanes in order to remain relatively impervious to corrosion and reflective of radiant energy preferably should be fabricated from stainless steel sheet and formed into the desired shape. It has been found that .018" sheet serves adequately as vane material. It is preferable that each vane be closed on its ends to keep the hot grease drippings from flowing into the vane interior. Further, these vanes may range in vertical length from 1½" to 2½" or more as determined by a number of parameters. The parameters involved include the spacing between adjacent heating units, the vertical distance from the heat sheath to the vane upper surface which as mentioned may range from $\frac{1}{32}$" to $\frac{1}{8}$", the maximum transverse horizontal dimension of the vane and the length of the vane, as mentioned.

Due to the curved upper surface configuration of all vanes, grease droplets from the cooking food will tend to roll off the vane top surface onto the vane sidewalls and down the sharply angled lower dihedral edge and into the drip tray, provided the droplets are not heated to their flash temperatures while on the vane. If a droplet falls on the vane it more than likely will fall on the vane at the uncovered outer edge of the top surface and will begin to roll off the curved top surface and down the sidewall. As a droplet flows down the vane sidewall, it will encounter cooling temperatures which will tend to rapidly lower the temperature of the droplet below its flash point. In this way any droplets which flash into burning on contact with the curved upper vane surface will tend to flow down the vane cooling to below the flash point temperature on their downward path.

Also, it has been found that heavy carbon residue immediately adjacent the sheath tends to excessively corrode the sheath. Thus, by providing heat transfer vanes which tend to discourage carbon residue, we tend to save the heating unit sheaths from excess corrosion which conceivably could be caused if carbon build-up were permitted about the sheath.

Figure 4:
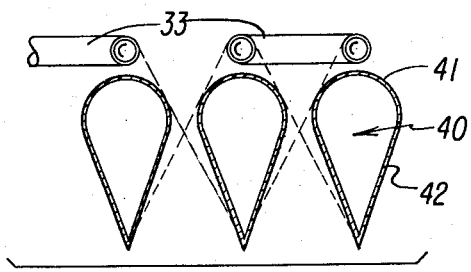

In FIGURE 4 is shown a tear drop shaped series of vanes 40. As can be seen, these tear drop shaped vanes each present a convex surface 41 to the adjacent heating unit; each vane has its widest transverse dimension near its upper edge and then curvedly tapers to the sharply angled lower edge. From FIG. 4 it can be seen that all downwardly directed radiant heat rays (indicated by broken lines) emanating from the heating units 33 will be intercepted by the curved sidewall 42 or top surface of the tear drop shaped vane 40. Also, it can be seen that each tear drop vane 40 forms a shielding air foil, with the heating unit at the trailing edge of the foil with respect to upwardly directed air currents. In this way, all ascending air currents in the cooking area will be deflected around the heating unit sheath. Thus little of the heat emitted by the heating units will be wasted by contact with these air currents. Further, the flow of air currents tends to keep the vane lower portion comparatively cool and as a result will tend to inhibit the fall of any burning grease from the vanes to the drip tray.

Figure 6:
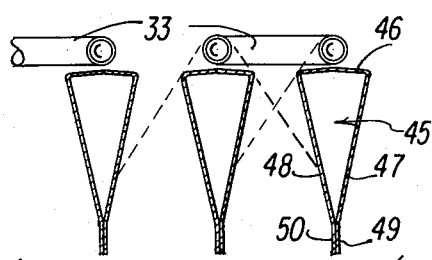
FIG. 6 is a side view of a third embodiment.

In FIG. 6 is shown another desirable cross-sectional configurations for the vanes. The vane 45 has its upper surface 46 substantially horizontal but with a slight central crowning adjacent to heating unit 33. The transverse dimension of the cross section of vane 45 extends somewhat beyond the vertical projection of heating unit 33 so that the slightly declivitous top surface will thereby intercept a greater portion of the downwardly directed radiant heat. Vane 45 has symmetrical side walls 47 and 48 each of which tapers inwardly to terminate in respective pendant flange extensions 49 and 50; thus in this embodiment, all direct radiation will be intercepted by top surface 46, sidewalls 47 and 48 or flange extensions 49 and 50.

Figure 5:
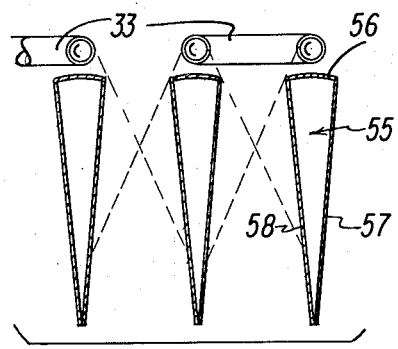
FIG. 5 is a side view of a second embodiment.

In FIG. 5 is shown another embodiment of vanes advantageously employed with the present invention. These vanes 55 exhibit a convex face 56 to the adjacent heating element but have a narrower transverse cross section than vanes 45. Vanes 55 compensate for this sectional narrowness by having side walls 57 and 58 of considerable length tapering to a comparatively sharp dihedral edge at their lowest extremity.

From the foregoing it can be seen that the parameters of transverse width, sidewall length and presence or absence of pendant flanges are interrelated and may be varied to include many permutations of these parameters which still perform the required functions. Utilizing the maximum range of these parameters, it can be calculated that the widest shields exemplified will deflect, refract or intercept all rays directed downwardly at an angle of less than 39° from the vertical. From this value, it can be seen that the angle of the sheath radiance which will be arrested is that subtended by the widest vane which would be 78°. With such a wide vane, the required vertical height of the vanes used need only be at the minimum. Thus where the narrowest vanes are used (32° subtended angle), the adjacent vanes must be of maximum length to intercept those rays emitted at greater than 16° from the vertical and less than 39°, all considered in the downward direction.

Figure 2:
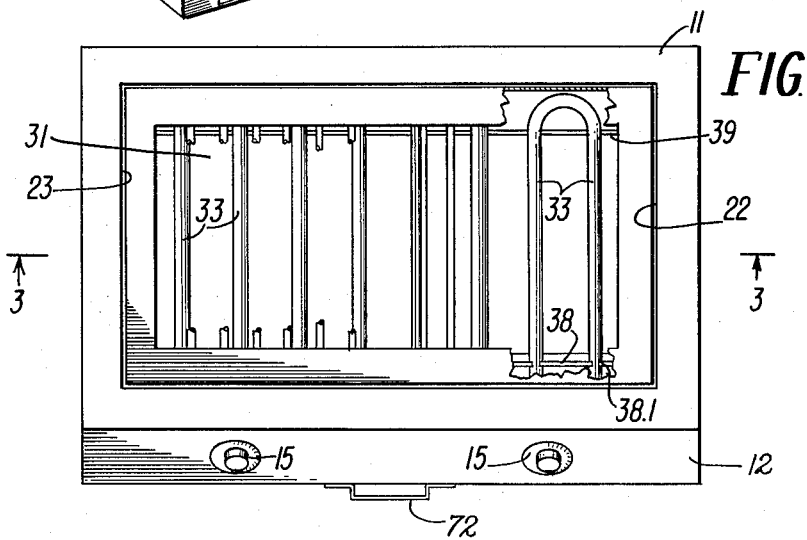
FIG. 2 is a top plan view of the cooking device of FIG. 1.
Figure 3:
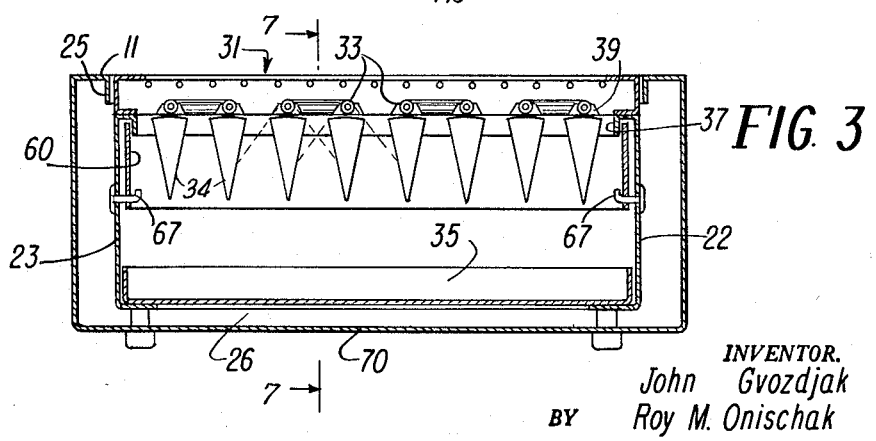
FIG. 3 is a side sectional elevational view of FIG. 2 taken along the lines 3—3' and FIG. 4 is a side view of one embodiment of the invention showing a first vane configuration for the device of FIG. 1.
Figure 7:
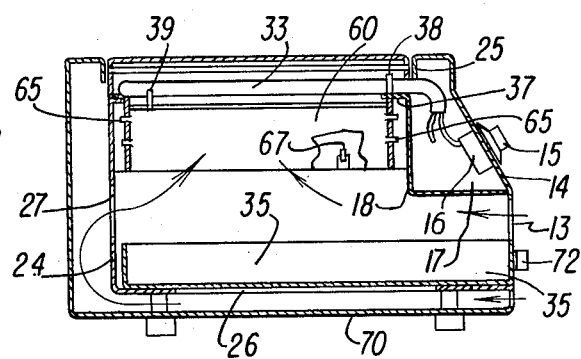
FIG. 7 is a side sectional elevational view of FIG. 3 taken along the lines 7—7'.

The vanes as described each comprise a recumbent right prism having the previously described cross-section. These prisms each may be confined within an open rectangular frame structure 60. As shown in FIGS. 1, 2 and 3, there are eight straight heating unit sections in the model shown, hence eight vanes must be secured in the frame structure 60. In any one broiler, preferably all vanes used would have the same configuration although this need not necessarily be the case. The vanes of whatever design used, may be affixed to their frame in any suitable manner. For example, as shown in FIG. 7, each vane 34 may have integral projecting tabs 65 extending through mating apertures 66 within the contiguous sidewalls of frame structure 60. The vane frame structure which comprises an open rectangular wall rests within the cooking area on suitable lugs 67 extending inwardly from the inner housing sidewalls 22 and 23. This frame structure 60 also serves as a support for the heating units 33 at a level inward of the support at clips 38. This support by providing a ledge on which the units may seat will inhibit the tendency of the heating units to sag with continued use.

The housing structure walls 18 and 24 terminate at their lower end in a false bottom wall 26 which rests on spacer a short distance above the normal bottom 70 of the housing. Resting on false bottom 26 is a shallow sheet metal drip pan 35 provided with a handle 72. The drip pan as may be seen in FIGS. 1 and 7, extends through the opening in wall 18 and the opening 12 in front of wall of the broiler so that in its normal position its front wall is collateral with the front wall. Drip pan 35 is employed to catch grease drippings falling from the vanes during the cooking operation. Needless to say, handle 72 may be used to grasp the grease dripping tray and remove same from the housing for cleaning.

The operation of the invention may best be understood by describing a typical broiler operation. The food which is desired to be broiled is placed on the grid 32 and the manual knobs 15 are adjusted to provide the required heating temperature. The energized heating units 33, attain a sheath temperature related to the wattage input determined by the setting of the knobs 15. At their operating temperature a considerable amount of radiant energy is released by these units. Since the outer sheath of each heating unit is cylindrical, radiant energy is emitted in a like amount in all radial directions. The upwardly directed portion of the emitted radiant energy may strike the top grid members 36 and will also strike and cook the food resting thereon. Of the downwardly directed radiant energy, a large proportion will strike the convex or crowned face of the vane directly below. A portion of the radiant energy striking the vane upper surface will be reflected by the stainless steel surface and will be redirected upwardly toward the heating unit sheath or the food. By virtue of the convex upper face, the vanes do not provide collecting surfaces for drippings from the food above but cause such drippings to flow down the vane sides and into the drip tray; in this way the vane top surface will in the main retain its reflective character. After a length of time, the upper surface of each vane will tend to absorb a proportion of the radiant energy directed toward its upper surface and will heat considerably. As a result each vane upper surface will then become a secondary heat emitter and will tend to flash burn all drippings which fall thereon. Due to the convex nature of the vane top surface and the shielding effect of the heating unit on to the central crown portion of the vane, drippings will strike the vane along the declivitous top edges or along the sidewalls. Thus, the greater amount of grease which can burn, will strike the heated vane at a sufficiently remote distance from the heating unit to keep any carbon residue away from the heating unit. This in effect, provides the charcoaling effect which is considered to be extremely desirable in food broiling without exposing the heating unit sheath to the corrosive effect of carbon accumulations.

Also, as mentioned, each of the vanes serves to intercept all downwardly directed radiant heat rays and thus shields the lower drip tray 35 from receiving any of these direct heat rays. By so deflecting these direct rays, the temperature of the drippings collected in pan 35 is kept below the flash point of the drippings. It has been found that utilizing the present invention, the grease in the drip pan readily remains at temperatures less than 400° F., which in turn is considerably below the generally agreed on flash point value of 590° F. for fats.

With the broiler construction as described having openings in the front walls, the so-called "chimney effect" was found to induce air flows upward at velocities greater than 140 feet per minute above and below the drip pan and considerably greater air flows through the cooking area. These currents while not of themselves sufficient to appreciably lower the temperature in the grease tray aided somewhat in the cooling process. As mentioned previously, each of the vanes serves to deflect all air currents rising from the body of the broiler housing and thus each individually shields the respective heating units from these air currents. It has been found that in this way the temperature of the heating units is increased by about 100° within its normal operating range without any increase in input wattage.

Further, it has been found that the upwardly directed air currents tend to cool the vane lower portions considerably. In addition, the comparatively poor heat transmission characteristics of the stainless steel body of each vane tends to impede the advance of heat down the body of the vane. By these combined actions, the temperature of the oblique lower section of the vanes tends to cool all passing burning grease droplets so that these droplets are below their flash temperature when reaching the drip pan.

While there has been described what is at present considered to be the preferred embodiment of the invention, it will be understood that various modifications may be made therein, and it is intended to cover in the appended claims, all such modifications as fall within the true spirit and scope of the invention.

What is claimed is:

1. In cooking apparatus comprising a casing, an electrical resistance heating unit disposed within said casing, said heating unit comprising a heat source encased within a tubular metal sheath for radiating heat energy, said sheath being configurated in a sinuous pattern including a plurality of straight run sections in mutually spaced relation; the invention comprising a radiant energy shield disposed below each of said straight run portions, each of said shields comprising a substantially convex face exposed to the heating unit above, depending inturned sidewalls extending from said convex face, said convex surface and said inturned sidewalls combinedly deflecting or absorbing all downwardly directed radiant energy from the straight run above said shield and from the next adjacent runs.

2. In a cooking apparatus comprising a casing, an electrical resistance heating unit disposed within said casing, said heating unit comprising a heat source encased within a tubular metal sheath for radiating heat energy, said sheath being configurated in a sinuous pattern including a plurality of straight run sections in mutually spaced relation, the invention comprising a radiant energy shield disposed below each of said straight run portions and coextensive therewith, each of said shields presenting a convex surface adjacent to said heating unit above, depending inturned faces extending from said convex surface, said convex surface and said inturned faces combinedly deflecting or absorbing all downwardly directed radiant energy from the straight run above said shield and from the next adjacent runs to thereby render each of said shields emissive of heat as a secondary source of absorbed heat.

3. In a cooking apparatus comprising a casing, an electrical resistance heating unit disposed within said casing, said heating unit comprising a heat source encased within a tubular metal sheath for radiating heat energy, said sheath being configurated in a sinuous pattern including a plurality of straight run sections in mutually spaced relation; the invention comprising a radiant energy shield disposed below each of said straight run portions and coextensive therewith, each of said shields presenting a convex surface adjacent said heating unit, co-terminous depending inturned faces extending from said convex surface, said convex surface and said inturned faces combinedly deflecting or absorbing all downwardly directed radiant energy from the straight run above said shield and from the next adjacent runs, said convex surfaces and said inturned faces also forming an airfoil with the heating unit at an edge thereof, said shield thereby shielding said heating unit from the upwardly directed air flow pattern in said casing.

4. In a cooking apparatus comprising a casing, an electrical resistance heating unit disposed within said casing, said heating unit comprising a heat source encased within a tubular metal sheath for radiating heat energy, said sheath being configurated in a sinuous pattern including a plurality of straight run sections in mutually spaced relation, the invention comprising a radiant energy shield disposed below each of said straight run portions and co-extensive therewith, each of said shields presenting a convex surface adjacent said heating unit, co-terminous depending angled faces extending from said convex surface, said convex surface and said angled faces combinedly deflecting or absorbing all downwardly directed radiant energy from the straight run above said shield and from the next adjacent runs, said convex surface and said angled faces also combinedly forming a vertically positioned airfoil with the heating unit at the trailing edge thereof, said shield thereby deflecting vertically ascending air currents from contacting the heating unit above.

References Cited in the file of this patent

UNITED STATES PATENTS

| | | |
|---|---|---|
| 1,077,866 | Ball | Nov. 4, 1913 |
| 1,587,023 | Mottlau | June 1, 1926 |
| 2,174,079 | Dadson | Sept. 26, 1939 |
| 2,812,706 | Del Francia et al. | Nov. 12, 1957 |
| 2,905,077 | Del Francia | Sept. 22, 1959 |
| 2,918,567 | Leitz | Dec. 22, 1959 |
| 2,971,083 | Phillips et al. | Feb. 7, 1961 |